United States Patent Office 2,895,881
Patented July 21, 1959

2,895,881

QUINIDINE GLUCONATE SUSTAINED MEDICATION TABLET

Tsugio Hamada, Philadelphia, Pa., assignor to Wynn Pharmacal Corporation, Philadelphia, Pa., a corporation of Pennsylvania No Drawing. Application April 4, 1957
Serial No. 650,560

2 Claims. (Cl. 167—82)

My invention relates to a sustained medication tablet and more particularly relates to a therapeutic composition of quinidine gluconate for oral administration wherein the tablet will disintegrate at a controlled rate throughout the entire digestive tract releasing the active drug over an extended period of time.

This is a continuation in part of my prior application, Serial No. 399,599, filed December 21, 1953.

In accordance with this invention, the quinidine gluconate is continuously released from the tablet over a long period of time comparable with the total period of the body's digestive processes. Since quinidine gluconate is utilized to insure regularity of heartbeat, it is important that the rate at which this drug is introduced by digestion does not exceed, even temporarily, a level producing toxic effects. Thus, by preventing the release of the drug in excessive quantities, toxicity or other undesirable side effects, are avoided because of the limitation of the maximum amount of the drug at any time available for absorption by the body. Therefore, it becomes practical to accurately control body levels by oral administration of a single large dosage of the drug to provide a level sufficient to meet the needs of the heart.

Accordingly, it is an object of my invention to provide a tablet for the oral administration of quinidine gluconate so that the heart will receive the beneficial effects thereof over an extended period of time.

Another object of my invention is to provide a tablet for the oral administration of quinidine gluconate wherein a portion of the active drug is partially released immediately within the mouth followed by constant and controlled release throughout the entire gastro-intestinal tract.

Another object of my invention is to provide a single dosage tablet of quinidine gluconate wherein the therapeutic effectiveness of the drug will be available for distribution to and absorption by the body over a period of from ten to twelve hours.

Another object of my invention is to provide a single dosage tablet of quinidine gluconate wherein release of excessive quantities of this drug at any time within the body is avoided and wherein the amount of this agent available for absorption does not exceed, even temporarily, a level producing toxic or other undesirable effects.

Another object of my invention is to provide a single dosage tablet of quinidine gluconate wherein the active drug will be continuously and constantly released at a controlled rate within the body and dispersed throughout the gastro-intestinal tract without becoming stuck en route.

Other objects of my invention are to provide an improved therapeutic composition of the character described, that is easily and economically produced and which is highly effective in operation.

Referring now to specific embodiments of my invention, I show the following examples which are illustrative of dosage unit forms and their preparation thereof.

EXAMPLE 1

This example represents a 10 grain tablet containing 5 grains of quinidine gluconate and is made from a two part granulation, as follows:

Part A 2 grains—quinidine gluconate
2 grains—powdered sugar
½ grain—starch

Part B 3 grains—quinidine gluconate
2¼ grains—hydrogenated castor oil
¼ grain—starch The part A is thoroughly intermixed in dry form whereupon the mixture is wet with a solution of 75% isopropyl alcohol and 25% water. The resulting damp mass is then placed upon flat trays and allowed to dry, using warm air. After the mass is dry, the dried mixture is forced through a 12 mesh screen.

The part B is mixed with sufficient isopropyl alcohol until damp, whereupon the mixture is heated slowly with constant stirring until the hydrogenated castor oil is melted and a homogeneous mixture is obtained. After the part B mixture has been placed on trays and allowed to dry, it is forced through a 12 mesh screen.

The resulting granules of each the part A and part B formulations are thoroughly intermixed and a trace of magnesium stearate added. The intermixed granules are then compressed to 10 grain tablets in a conventional machine.

EXAMPLE 2

This example represents a 10 grain tablet containing 4.5 grains of quinidine gluconate and is a single part mixture as follows:

4.5 grains—quinidine gluconate
3.5 grains—hydrogenated castor oil
1 grain—starch
1 grain—ethyl cellulose The hydrogenated castor oil and ethyl cellulose are heated together until thoroughly melted and homogeneously intermixed. The quinidine gluconate is mixed with the starch and enough isopropyl alcohol added until this mixture is damp. The latter mixture is added to the melted liquid of hydrogenated castor oil and ethyl cellulose and while the melt is continuously being heated, the liquid is continuously stirred until a homogeneous mixture is obtained. This mixture is then poured upon trays and allowed to cool and solidify. The solidified material is then granulated by forcing it through a screen or sieve of 12 mesh.

A trace of lubricant such as magnesium stearate is added to the granulations and thoroughly intermixed. The granules are then compressed into 10 grain tablets in a conventional tablet machine.

It is to be observed that either of the examples set forth above may be varied as to the final tablet size or with departures in the formulation.

It is also to be understood that various enteric materials such as waxes, fats, fatty acids and hydrogenated oils may be substituted in suitable proportions for the castor oil in the examples given without departing from the scope of this invention as follows:

Waxes:
 Bees
 Opal
 Bayberry
 Candelilla
 Carnauba
 Ceresin

Japan
Montan
Metro crystalline-cerilene
Paraffin
Ozokerite
Ouricury
Spermaceti
Fatty acids:
  Oleic acid
  Tallow fatty acid
  Stearic acid
  Cottonseed fatty acid
  Soyabean fatty acid
  Cocoanut fatty acid
Hydrogenated oils:
  Castor
  Cottonseed
  Peanut
  Soyabean
  Tallow
  Sperm
  Corn
  Olive
  Palm
  Rapeseed
  Cocoanut Glyceryl stearates and/or oleates and their higher homologues may also be satisfactorily incorporated. It has been found that a tablet made in accordance with the teachings of the above produces an average quinidine level of 2 to 4 milligrams per liter of blood plasma over a period of twelve hours when a single dosage of 1 gram is taken internally. It has been further found that effective quinidine levels can be obtained by the taking by oral administration of one tablet every 10 hours.

Although my invention has been described in considerable detail, such description is intended as being illustrative rather than limiting, since the invention may be variously embodied, and the scope of the invention is to be determined as claimed.

I claim as my invention:

1. A process of making a therapeutic tablet containing quinidine gluconate suitable for oral administration to control heart action which process consists of mixing and heating three and one-half parts by weight of hydrogenated castor oil and one part by weight of ethyl cellulose until both are thoroughly melted and a homogeneous mixture is formed, separately mixing four and one-half parts of quinidine gluconate by weight with one part of starch by weight and only a sufficient amount of isopropyl alcohol to render the mixture damp, adding the damp mixture to the molten mixture while heating the molten mixture, stirring the two mixtures and continuing the stirring and heating until the hydrogenated castor oil, ethyl cellulose, quinidine gluconate and starch become intermixed and form a homogeneous mixture, pouring the mixture upon trays and permitting it to cool and solidify, granulating the solidified material by forcing it through a 12 mesh screen, adding a trace of magnesium stearate to the granules and thoroughly intermixing the magnesium stearate with the granules and thereafter compressing the thus obtained mixture into tablets of the desired size.

2. An orally administered therapeutic tablet for use in regulating heart action consisting essentially of four and one-half parts of quinidine gluconate, three and one-half parts of hydrogenated castor oil, one part of starch, one part of ethyl cellulose all parts being by weight and a trace of magnesium stearate homogeneously mixed together.

References Cited in the file of this patent

UNITED STATES PATENTS

| | | |
|---|---|---|
| 2,373,763 | Kuever | Apr. 17, 1945 |
| 2,413,419 | Saunder et al. | Dec. 31, 1946 |
| 2,540,253 | Gakenheimer | Feb. 6, 1951 |
| 2,566,200 | Hickey | Aug. 28, 1951 |
| 2,736,682 | Hermelin | Feb. 28, 1956 |
| 2,793,979 | Svedres | May 28, 1957 |

FOREIGN PATENTS

| | | |
|---|---|---|
| 285,091 | Great Britain | June 10, 1929 |
| 288,542 | Great Britain | June 11, 1929 |
| 514,047 | Great Britain | Oct. 30, 1939 |
| 109,438 | Australia | Jan. 11, 1940 |

OTHER REFERENCES

Silver et al.: "Manuf. of Compressed Tablets," F. J. Stokes Machine Co., 1944, pp. 10, 14, 20 and 21.

Merck Index, 6th ed., Merck and Co., Inc., Rahway, N. J., 1952, pp. 817, 818.